United States Patent [19]

Matsui et al.

[11] 4,339,090
[45] Jul. 13, 1982

[54] COP SUPPLYING METHOD FOR AUTOMATIC WINDING MACHINE

[75] Inventors: Isamu Matsui, Kyotoshi; Buro Suganuma, Nagaokakyoshi, both of Japan

[73] Assignee: Murata Kikai Kabushiki Kaisha, Japan

[21] Appl. No.: 168,023

[22] Filed: Jul. 14, 1980

Related U.S. Application Data

[62] Division of Ser. No. 928,599, Jul. 27, 1978, Pat. No. 4,212,333.

[30] Foreign Application Priority Data

Jul. 29, 1977 [JP] Japan .................. 52-92081

[51] Int. Cl.³ ...................... B65H 54/20; B65H 67/06
[52] U.S. Cl. ............................................. 242/35.5 A
[58] Field of Search ...................... 242/35.5 A, 35.5 R, 242/35.6 R; 414/300, 301, 302, 303

[56] References Cited

U.S. PATENT DOCUMENTS

| | | | |
|---|---|---|---|
| 2,010,465 | 8/1935 | Reiners et al. | 242/35.5 A |
| 3,111,280 | 11/1963 | Reiners et al. | 242/35.5 R |
| 3,368,766 | 2/1968 | Livingston | 242/35.5 R |
| 3,421,705 | 1/1969 | Benedict | 242/35.5 R |
| 3,474,975 | 10/1969 | Brouwer et al. | 242/35.5 R |
| 3,506,209 | 4/1970 | Matsui et al. | 242/35.5 R |
| 3,774,859 | 11/1973 | Brouwer et al. | 242/35.5 R |
| 3,933,320 | 1/1976 | Tsurumi et al. | 242/35.5 R |
| 3,966,141 | 6/1976 | Nishiyama et al. | 242/35.5 A |
| 3,998,397 | 12/1976 | Haberkorn et al. | 242/35.5 A |

Primary Examiner—Stanley N. Gilreath
Attorney, Agent, or Firm—Whittemore, Hulbert & Belknap

[57] ABSTRACT

A cop supplying truck which runs along the individual winding units of an automatic winding machine is provided. The cop supplying truck travels while storing the cops accomodated in an individual cylindrical cop container and feeds the cops into a magazine of a winding unit without stopping at the individual winding units. The cop supplying truck is provided with a hole through which the cop falls onto the magazine. The cops are travelled and fed by means of a first conveyer device which works to successively convey the cop containers toward the falling hole, a device which takes one of the cop container while the cop supplying truck passes over the empty magazine, and a second conveyer device which so works that a cop in the taken-out cop container is only allowed to fall into the magazine through the falling hole.

3 Claims, 16 Drawing Figures

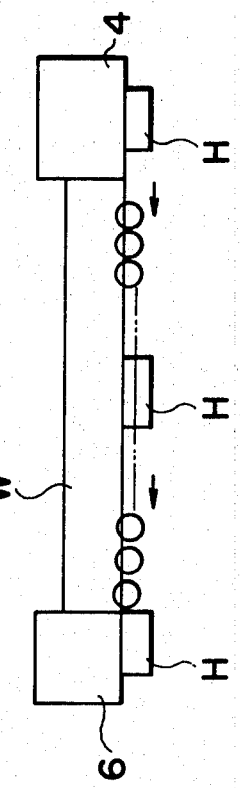
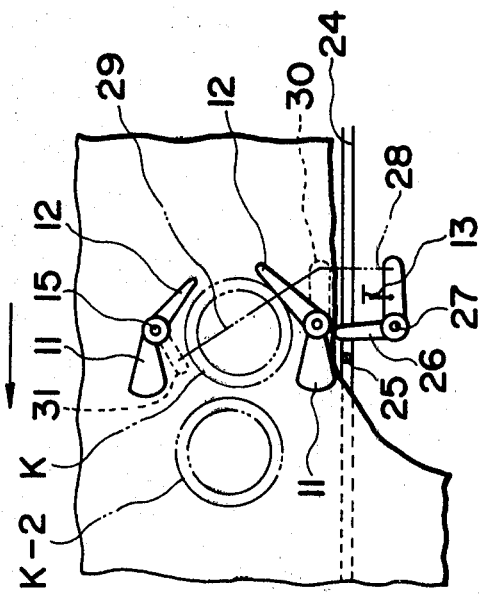
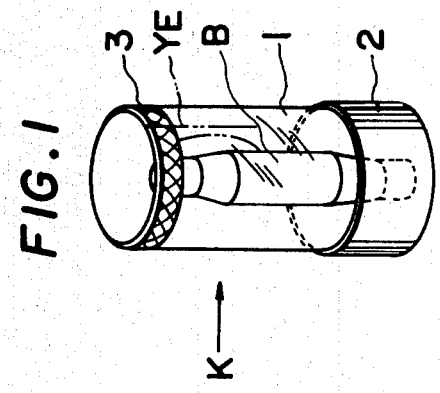
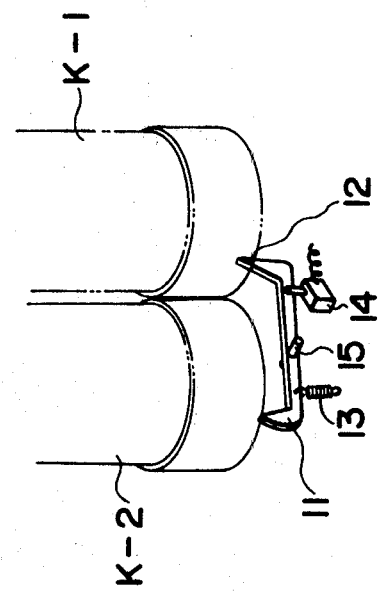

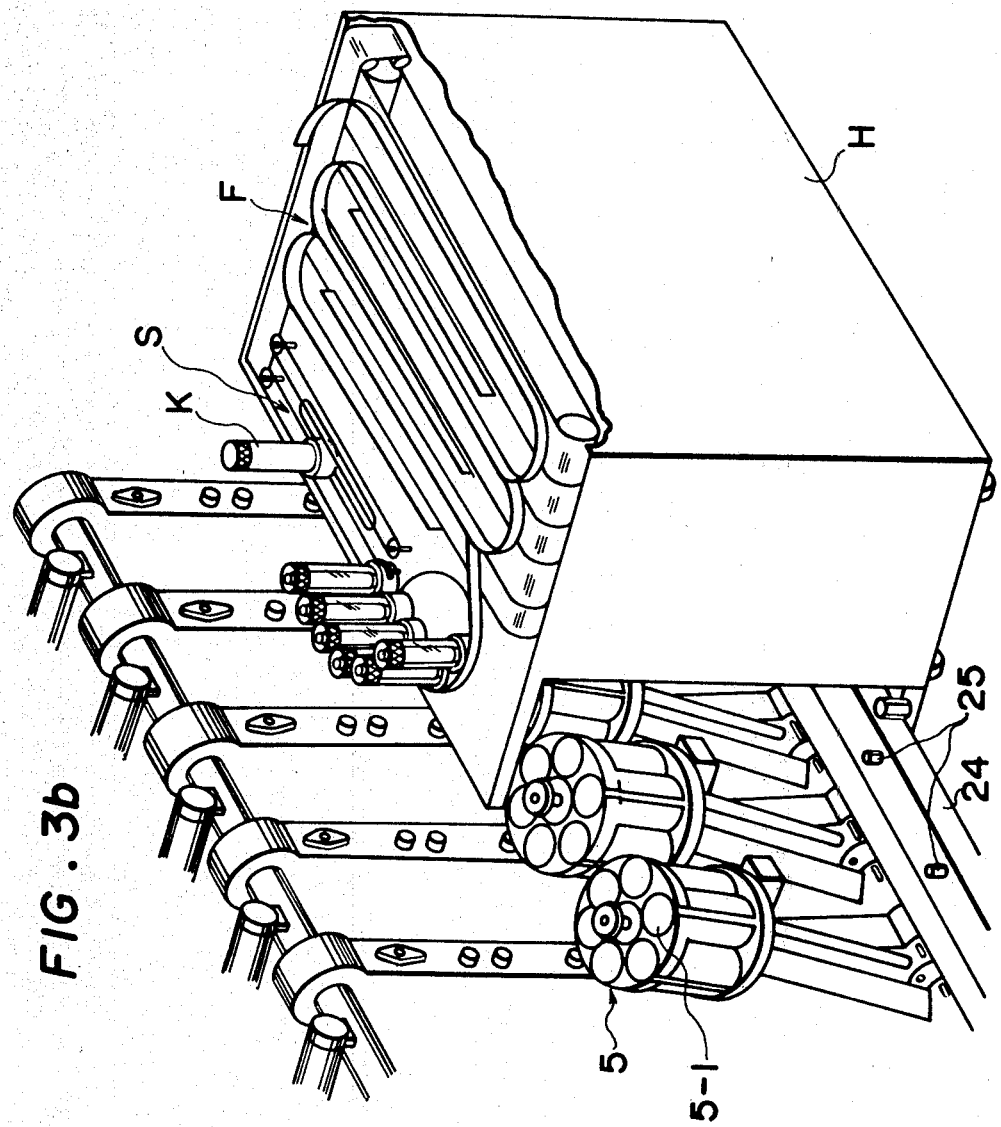

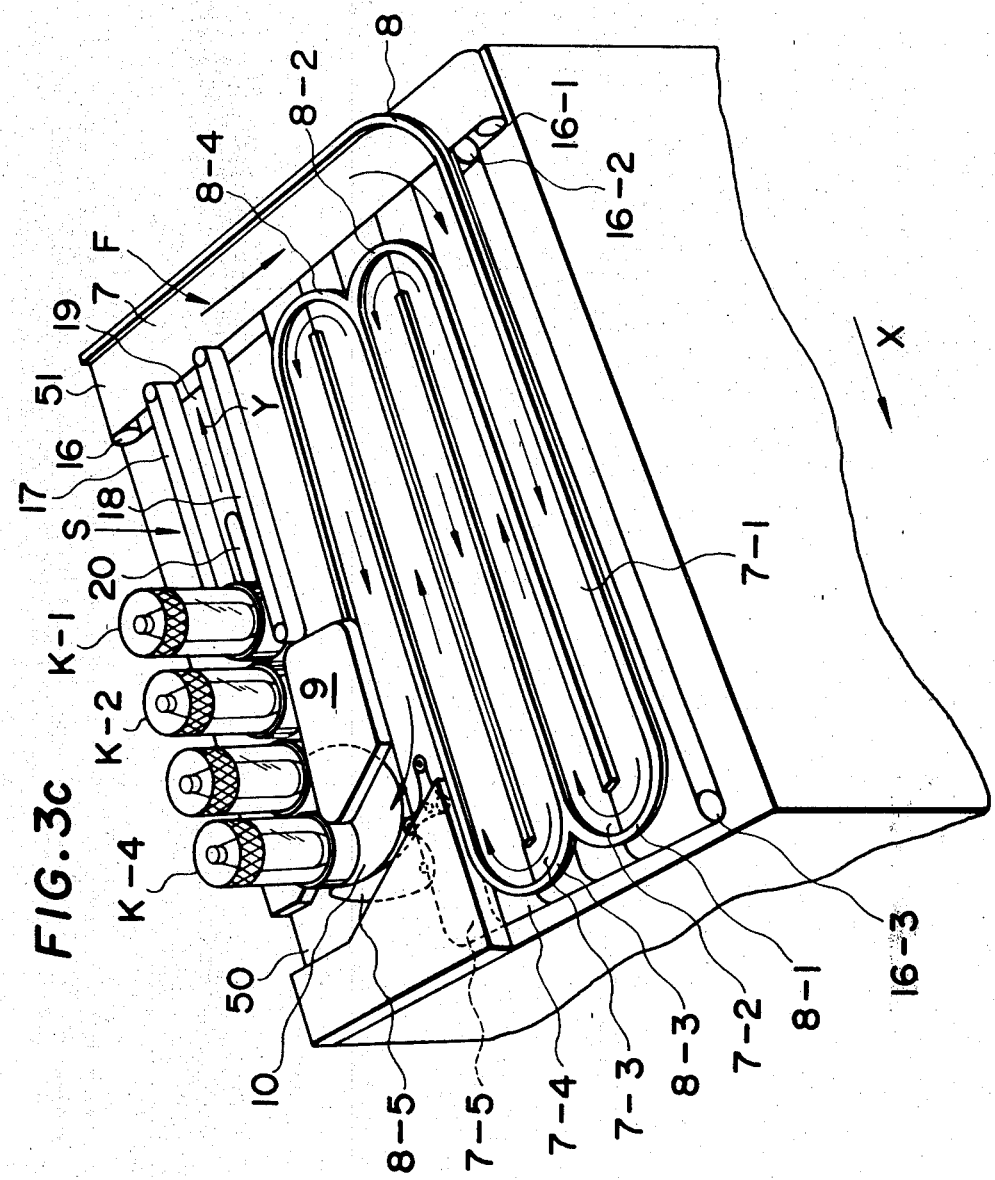

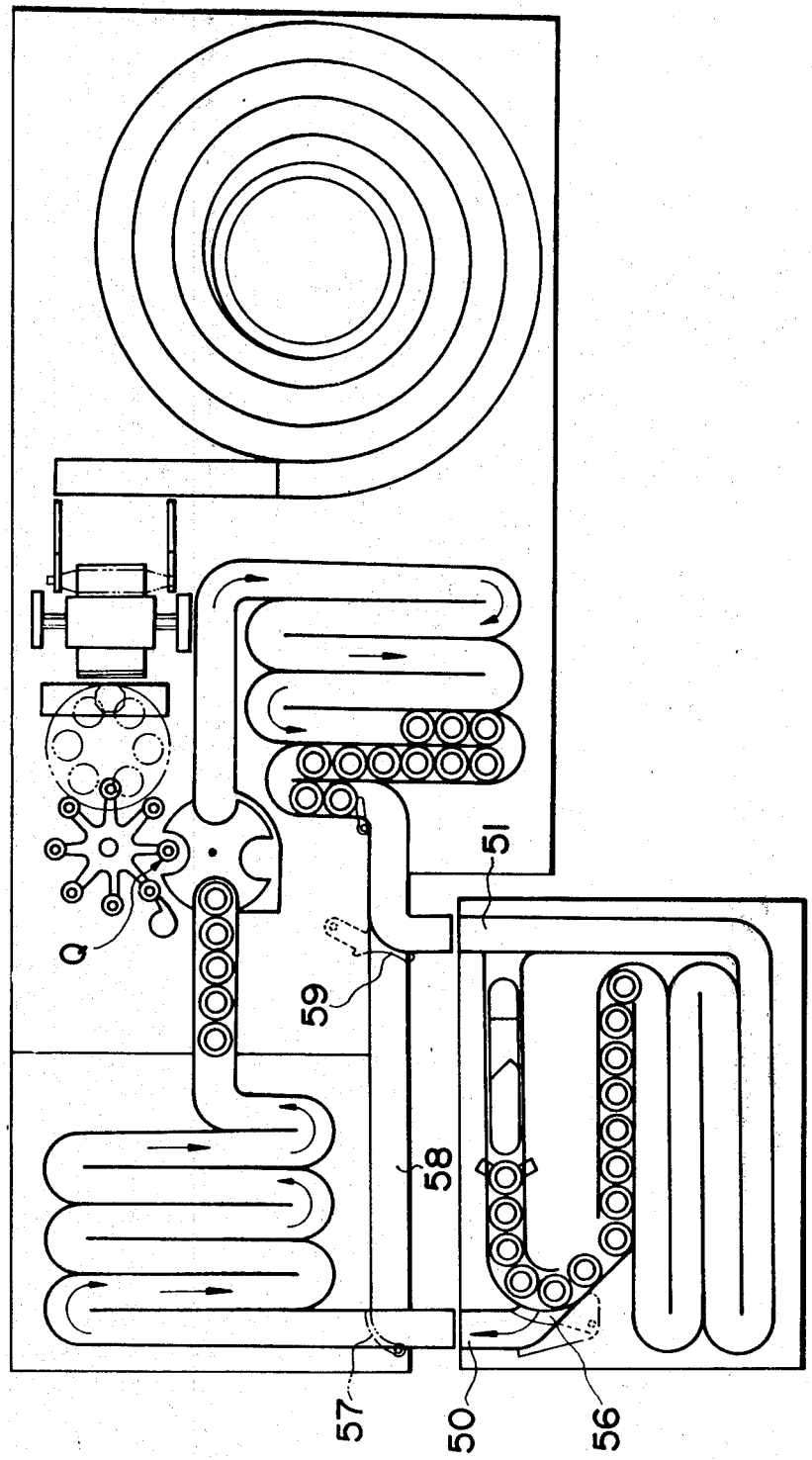

COP SUPPLYING METHOD FOR AUTOMATIC WINDING MACHINE

This is a division, of application Ser. No. 928,599 filed July 27, 1978, now U.S. Pat. No. 4,212,333.

BACKGROUND OF THE INVENTION

It has so far been widely performed to supply a fully packaged cop to an automatic winding unit instead of an empty cop.

According to one method, for example, a winding unit consisting of a winding drum, a slub catcher, an empty paper tube and an empty paper tube support cradle was travelled. According to another method, on the other hand, the winding unit was fixed. In either case, however, it was necessary to store the fully packaged copy in the magazine as to quickly exchange the empty cop for a new packaged cop. A variety of methods were so far proposed to supply the fully packaged cops into the magazine either manually or automatically.

This present invention relates to an apparatus for automatically supplying the cops, which is suited for use in an automatic winding machine having winding units of the fixed type, the individual winding units being equipped with a magazine.

The applicant has previously filed Japanese Patent Laid-Open No. 134955/74 entitled "Method and Apparatus for Supplying Cops", dealing with an apparatus for automatically supplying cops having the combined merits of automatic feeder and manual service characterized by the provision of magazine-equipped winding units of the fixed type, wherein the cops were allowed to be thrown into the magazine and the cop containers being a bottom plate which can be opened or closed were secured on the conveyer at the rear side of the machine, so that the fully packaged cop in the cop containers could be supplied to the winding units.

According to the method proposed in the above-said patent application, the half-packaged bobbins in the magazine were first supplied to a peg and, when there was no cop in the magazine, the fully packaged bobbins on the conveyer were supplied to the peg.

Although the apparatus of the above-said previous application yielded sufficiently good results, some inconvenience were still involved. For instance, if there would be small number of half-packaged bobbins in the magazine, the magazine remains empty for a long time to decrease the merit of the magazine, and furthermore, it was necessary to install an additional device for preferentially supplying half-packaged bobbins in the magazine over the fully wound bobbins.

SUMMARY OF THE INVENTION

This present invention is related to a cop supplying method and apparatus for use in automatic winding machine and its object is to supply the cops to the automatic winding machine at high speeds, and to propose an apparatus having reduced number of parts.

The inconvenience associated with the apparatus of the aforesaid prior application could be overcome if the cops are automatically supplied from the conveyer into the magazine provided on each of the winding units.

According to this present invention, the cops are not directly fed from the conveyer to the winding units but are fed into the magazine and then the cops will be fed onto the pegs of the winding units.

In this case, it is not necessary to provide a space for providing extra magazines on the side of the conveyer as that in the above-said prior application. However, there arises a second problem that the cops must be quickly replenished to the magazine on account of the increased number of winding units by one winding machine and increased winding capacity.

According to this present invention, the apparatus is equipped with a cop supplying truck which travels along the individual winding units of the automatic winding machine thereby to feed the cops to the magazine while it is running without stopping at the individual winding units.

That is, while the cop supplying truck is running, the cops in the individual cop container are allowed to be transferred on the supplying truck in a direction opposite to the running direction of the supplying truck and at an equal speed to that of the supplying truck, whereby the cops are maintained at a zero speed relative to the magazine and thrown into the magazine from the supplying truck.

According to this present invention, the cylindrical cop containers without bottoms are used as a medium for transferring the cops, and a plurality of cop containers contained on the supplying truck are moved, in order that the cops in the cop container can be thrown into the magazine.

In this case, the running supplying truck is equipped with a first conveyer device for storing and conveying said cop containers, a device for taking out one of the cop containers, and a second conveyer device for transferring one unit of the cop container taken by said take-out device, wherein a bottom plate of said second conveyer device is formed with a hole which allows the cop only to fall therethrough but preventing the fall of the cop container.

The second conveyer device causes the cop container to travel in a direction opposite to the running direction of the supplying truck and at an equal speed to that of said supplying truck, whereby the relative speed between the magazine and the cop container is maintained at zero. In this case, since the supplying truck is running, the hole perforated through in the bottom plate secured to the supplying truck moves also.

When the cop container which is travelling at a zero speed relative to the magazine is conveyed on the hole at the bottom plate, the cop only is allowed to fall from the cop container onto the magazine.

In this way, according to the present invention, the cop supplying truck can feed the cops without stopping. It is, therefore, allowed to feed the cops from the automatic cop feeding apparatus to the magazines of the individual winding units of the automatic winder continuously and at high speed.

As an example, in the method for supplying cops from the belt travelling in front of winding units to a chute secured to each winding unit, the speed of belts is limited in the rage of 15 to 20 m/min. owing to problems in time for opening and closing a lid and in timing. In the present invention the size of the hole provided on the supplying truck is determined according to the speed of the supplying truck so that the speed of the truck is able to select as occasion demands. In one embodiment of the present invention the speed of the truck may be 30 m/min.

BRIEF DESCRIPTION OF THE DRAWINGS

FIG. 1 is a perspective view showing one embodiment of a cop container;

FIG. 2 is a diagram for illustrating the arrangement of the apparatus according to this present invention;

FIG. 3b is a perspective view showing a relation between a cop supplying truck and the magazine of the apparatus according to this present invention;

FIG. 3c is a perspective view showing another embodiment of the supplying truck;

FIG. 3e is a plan view showing a relation between the supplying truck and the automatic cop feeding apparatus;

FIG. 4a is a perspective view showing an embodiment of a take-out device;

FIG. 4b is a plan view showing another embodiment of the take-out device;

FIG. 7b is a side view showing the device of FIG. 7a;

DETAILED DESCRIPTION OF THE INVENTION

Figure 3A:
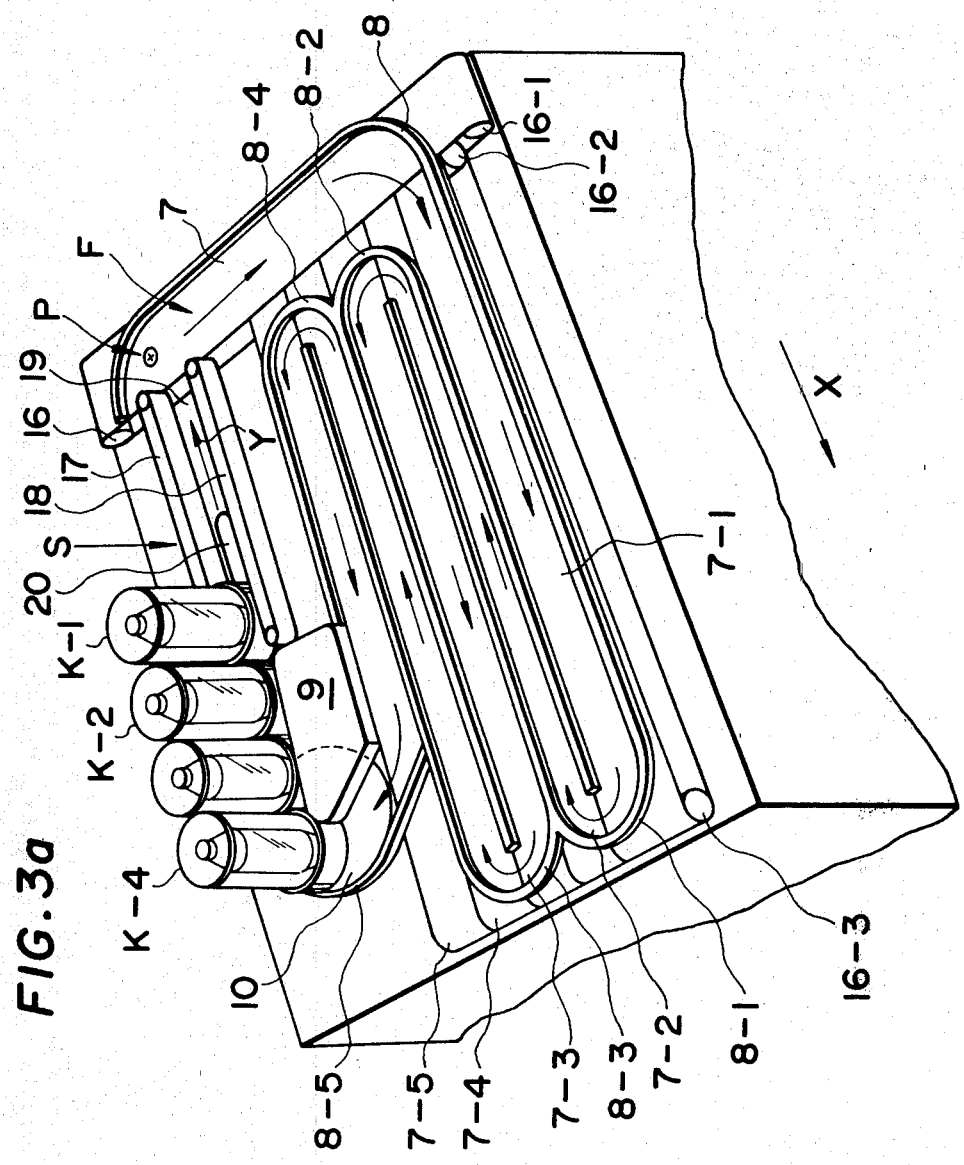
FIG. 3a is a fragmentary perspective view of the present invention.

This present invention is illustrated below in conjunction with embodiments shown by way of the accompanying drawings. Referring to FIG. 1, a cop container K is composed of a cylindrical body 1 made of a suitable material such as a transparent plastic material, the lower portion of which being attached or detachably attached with a stabilizing ring 2 made of a steel or the like, and the upper portion of which being attached or detachably attached with a ciliated adhesive tape or a velvet-like fastener 3.

The outer diameter of the stabilizing ring 2 is slightly greater than the outer diameter of the cylindrical body 1 such that even when the cop containers are closely arrayed, the ends of the yarn captured by said tape will not be entangled and further the cop containers keep their balance.

The cop container K is erected vertically by the stabilizing ring 2. However, since it does not have a bottom plate, the cop is not held in the cop container where there is no member that serves the cop as the bottom plate.

Winding yarns into bobbins, spools and paper tubes and other wound yarn packages, herein all briefly referred to as "cops". The cops B are thrown from a customary automatic cop feeding apparatus 4 into the individual cop containers K. At this moment, the cops are slightly moved in the cop containers, and then the end YE of the yarn is cut and adhered onto said tape 3. Examples of the automatic cop feeding apparatus may be one shown in FIG. 1 of Japanese Patent Laid-Open No. 40452/76 that was previously filed by the applicant of this present application, or one that is disclosed in Japanese Patent Laid-Open No. 134955/74 that was previously filed by the applicant of this present invention and in which the cops are thrown into the cop container placed on the conveyer.

As shown in Japanese Laid-Open No. 107344/77, an automatic winding machine W consists of fixed winding units arrayed in parallel, wherein each of the units has a magazine 5 for feeding the cop to a peg as shown in FIG. 3b.

A cop supplying truck H travels from the position of the automatic cop feeding apparatus 4 to an automatic winder drive portion 6 at the upper and side portions of the cop feeding magazine 5 along the automatic winder W (refer to FIG. 2). The cop supplying truck H has two conveyer devices as shown in FIG. 3a to FIG. 3d.

One is a first conveyer device which transfers the cop containers into which a cop is fed from the automatic cop feeding device 4, and then stores the cop containers in relation to the take-out device on the cop supplying truck.

Another is a second conveyer device which causes the individual cop container taken away from the above first conveyer device to move in a direction opposite to the running direction of the supplying truck and at a speed equal to the supplying truck.

The first conveyer device F has a belt 7 that serves as a bottom plate for the cop container when it is being conveyed.

The belt 7 conveys the cop containers in an erected manner, and should desirably be shaped in the form of a caterpillar to withstand the weight of the cop containers and cops to exhibit resistance against wear. For this purpose, the belt 7 will be made of a plastic material or the like having resistance against wear.

In the initial movement, the number of the cop containers on the supplying truck should be equal to or greater than the number of winding units. However, when the automatic winder is in operation, all of the winding units do not simultaneously require the replacement with fully wound cops. Therefore, the number of the cop containers will be determined depending upon the cases. In any way, the supplying truck should be designed in a compact size, and said belt 7 should be provided in a plurality of numbers and the path for conveying the cop containers should be curved, so that the apparatus will be able to deal with considerably large number of cop containers, for example, as many as 50 cop containers.

The cop containers K placed on the belt 7 are conveyed up to the position of a guide 8 where they are pushed by the belt 7 and the succeeding cop container K to ride on a belt 7-1, and are further conveyed by the belt 7-1 and pushed by the succeeding container thereby to ride on a belt 7-2, and finally reach a belt 7-5.

The cop containers are erected vertically while they are being conveyed; during this moment, the belt 7 serves as a bottom plate and the cops do not escape from the cop containers.

The stabilizing rings 2 of the cop containers serve to keep the cop containers vertically erected. Further, by so setting the position of the guide 8 as to engage with the upper portion of the stabilizing rings 2, it is possible to prevent the cop containers from being fell forward or backward when they are being transferred from belt to belt.

When being transferred from belt to belt, the cop containers may be caused to rotate upon contact with the guide 8 thereby causing the cops to rotate, too. In such a case, when the upper end of the cop B of which yarn end is adhered to the tape 3 is protruding beyond the upper end of the cop container, the yarn end adhered to the tape may be separated apart therefrom being pulled by the cop depending upon the turn of the cop or the cop container. This inconvenience can be avoided if the height of the cop container is selected to be greater than the size of the cops.

In the case of the embodiment shown in FIG. 3a, the cop containers K on the belt 7-5 are advanced to the take-away position in relation to a rotary disk 10 being guided by the guide 8-5 and a guide 9.

The first cop container K-1 is stopped by a stopper which belongs to the take-out device; the succeeding cop container drums K-2, . . . are also stopped by the stopper.

The take-out device may be a conventionally employed one. FIGS. 4a and 4b show the most simplest examples.

In the case of FIG. 4a, the cop container drum K-1 is stopped by a pawl 12 of an oscillating rod at the inner side of the cop container; therefore, the succeeding cop container K-2 is naturally stopped.

As a switch provided on the supplying truck H is turned on by a cam according to a new cop supplying request from the winding unit, a solenoid 14 is actuated against the force of a spring 13, whereby a stopper 12 turns with a fulcrum 15 as a center to release the engagement from the cop container drum K-1. A pawl 11 of the oscillating rod rises until it engages with the cop container K-2. The cop container is pushed forward by the succeeding cop container until the stopper 11 engages with the cop container K-2.

Then, as a solenoid 14 is turned off, the stopper 12 is caused by the spring 13 to rise on the inner side of the cop container K-2, whereby the cop container K-2 is engaged with the stopper 12 and stopped.

During this period, the belts 7, 7-1 to 7-5, and the rotary disk 10 are continuously turned.

FIG. 4b shows an example where the cop container drum is stopped being held at the outer side.

In the case of FIG. 4b, the cop container K-1 is stopped by the stopper 12 being held at the outer side. When the stopper 12 is opened, the stopper 11 works to stop the succeeding cop container K-2.

Reference numeral 24 designates a rail on which the supplying track H travels. The rail is equipped with operation pins 25 which cause a lever 26 provided on the lower side of the supplying truck to turn with a fulcrum 27 as a center against the force of the spring 13; the stopper 12 on the upper surface of the supplying truck is opened via rods 28, 29 of a link device, levers 30, 31, and a shaft 15.

In the first conveyer device F, the belts 7, 7-1 to 7-5 are driven by a conventional mechanical means. FIG. 3 simply shows sprockets 16 to 16-3.

In practice, however, the number of these sprockets will be increased, or a drive shaft and driven shafts will be superposed on the inner side of the belt so as to selectively come into contact with the belt.

The second conveyer device S is so designed that the belts 17 and 18 will guide the cop containers K by holding them from the outer side. In this case, the moving direction is changed by 90 degrees with respect to the belt 7; the belt, therefore, does not serve as a bottom plate for the cop container. The second conveyer S, therefore, is provided with a fixed bottom plate 19.

The belts 17 and 18 may be of the type of conveying the cop containers by friction, or may be equipped with magnets spaced apart by a predetermined distance such that the stabilizing rings of the cop containers made of steel are adhered and conveyed, or may further be equipped with engaging pawls to convey the cop container drums by way of hooking.

The drawings show the embodiment of the type which conveys the cop containers by holding them between the endless belts 17 and 18.

According to the embodiment, the cop containers were perfectly conveyed without developing slipping when the belts were pushed from the outer side by means of a plate member and a spring.

The belts 17 and 18 are extended from the position of taking out the cop container to the position of the belt 7 of the first conveyer device. Another belt may be provided between the belt 7 and the belts 17, 18, so that the cop containers are delivered from the supplying truck to an external unit, i.e., to an automatic cop feeding apparatus. It is further allowable to provide a belt to deliver the cop containers from the position of the take-away device to the outer side of the supplying truck. The above-said belt for carrying the cop containers to the automatic cop feeding apparatus, however, presents a problem in regard to at which position the new cops should be thrown in relation to the empty cop containers.

The belts 17 and 18 are arrayed to be in parallel with the rail on which the supplying truck runs, i.e., in parallel with the longitudinal direction of the automatic winder, and the belts 17 and 18 are run at a speed equal to the moving speed of the supplying truck. A hole 20 is formed in the bottom plate 19 at a middle position between the belts 17 and 18. The position of the hole is determined by the speed of the supplying truck, the speed of the belts 17 and 18, and the timing of falling the cop over to the magazine 5 of the winding unit. The size of the hole is so selected that the cop container drum is not allowed to fall but the cop only is allowed to fall. That is, the size of the hole is selected to be smaller than the inner diameter of the cylindrical cop container but greater than the outer diameter of the outer yarn layer of the cop. Further, since it is difficult to bring the speed of the belts 17 and 18 into strict conformity with the speed of the supplying truck H, it is desired that the hole 20 is formed in an elongated shape parallel to the travelling direction of the belts 17 and 18 to compensate slight deviation in the timing of falling the cops. It is further desirable to provide a guide plate 21 beneath the elongated hole so as to serve as a guide when the cops fall onto a magazine can 5-1 (see FIG. 5).

It is because, as will be obvious from FIGS. 3a and 3b, the magazine can 5-1 is usually tilted, and in order for the supplying truck to travel above the magazine can 5-1, it is necessary to provide a considerable distance between the hole 20 and the magazine can. Thus, the provision of a guide plate helps prevent the erroneous operation in throwing the cops into the magazine can. The elongated hole should have a size in the lengthwise direction so as to permit the free falling of the cop while it is passing therethrough, and is therefore related to the speed of the supplying truck.

Figure 5:
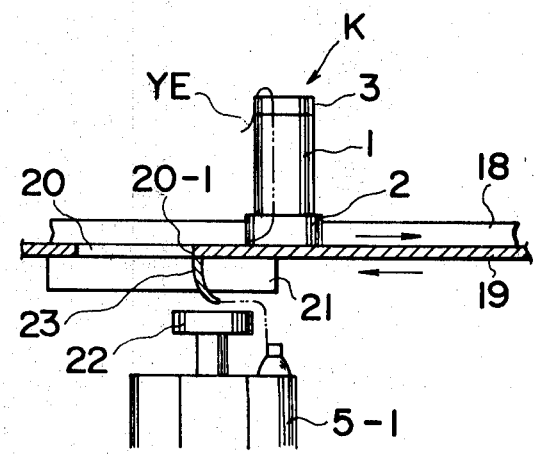
FIG. 5 is a view illustrating the state in which a cop is supplied by the apparatus of this present invention.

Referring to FIG. 5, when a cop is thrown into the magazine can 5-1, there is no change in position between the cop container K and the magazine can 5-1 but the bottom plate 19 moves toward the left and the belt 18 moves toward the right.

Since the yarn end YE of the cop is adhered onto the velvet fastner or the tape 3, the cop falls from the cop container K into the magazine can 5-1 while the yarn is unwound from the cop.

The yarn between the tape 3 and the cop passes through the hole 20 of the bottom plate 19. Therefore, as the bottom plate 19 moves leftwards in the FIG. 5, the rear end 20-1 of the hole 20 moves leftwards gripping the yarn. The end of the yarn is therefore forcibly pulled apart from the tape 3, and is forcibly introduced into a suction nozzle 22 at the center of the magazine. It is also allowed to use a cutter instead of detaching the above-said yarn end, though it presents a problem when the cop container drums are to be used again.

When there is a considerable distance between the bottom plate 19 and the magazine can 5-1 as mentioned above, there arises a difficulty in regard to guiding the yarn end detached from the tape 3 by the rear end 20-1 of the hole into the suction nozzle. The rear end 20-1 of the elongated hole, therefore, should be formed in a shape suited for guiding the yarn end into the suction nozzle, or a yarn-end guide 23 should be provided at the rear end of the elongated hole.

It is further allowed to provide a cam on the side of the supplying truck to adjust the staring timing of the suction nozzle, so that the cam will work to turn on and off the suction nozzle 22.

For example, as disclosed in Japanese Utility Model Publication No. 35158/75 entitled "Device for sucking the yarn end of bobbin magazine", the suction nozzle may be composed of a double pipe, wherein an opening of an inner pipe that is slidably mounted in an outer pipe and an opening of the outer pipe communicated to the suction source is usually deviated by means of a spring, and in a particular case, the opening of the inner pipe is brought into agreement with the opening of the outer pipe against the force of the spring, and the inner pipe is moved by means of a conventional link mechanism and a lever, whereby the object is attained when said lever is pushed by a titled cam provided on the supplying truck accompanying the movement of the supplying truck.

In the case of the take-out device shown in FIG. 4b, the cops will be thrown into the magazine can by the pin 25 irrespective of whether the magazine contains the cops or not, thus giving inconvenience.

Figure 6:
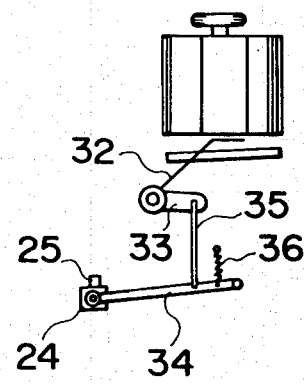
FIG. 6 is a side view showing an embodiment of a device which detects whether there is a cop in the magazine.

To cope with such an inconvenience, the pin 25 is retractably provided as shown in FIG. 6. A feeler 32 is provided on the bottom of the magazine, and the change of the feeler caused by the presence or absence of the cops is so utilized that the pin 25 will protrude or retract above the rail 24 by means of levers 33, 34, rod 35 and spring 36.

In this case, the change of the feeler 32 may of course be converted into electrical motion to project or retract the pin.

Figure 7A:
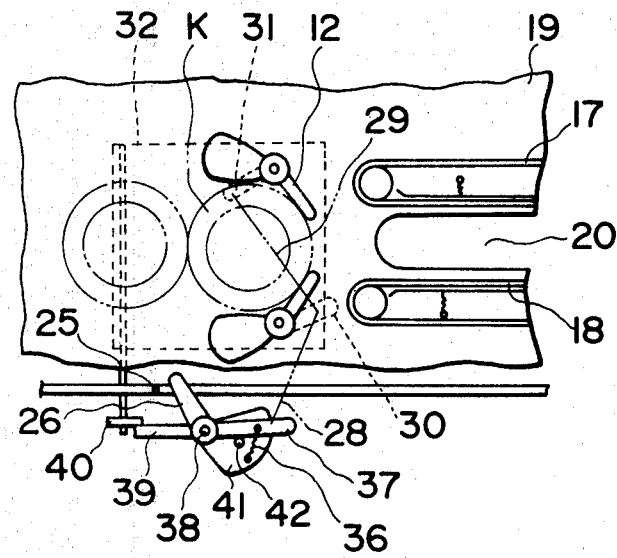
FIG. 7a is a plan view of a by-passing device in which a feeler is provided in the supplying truck in the case that the cop is present in the magazine.
Figure 7B:
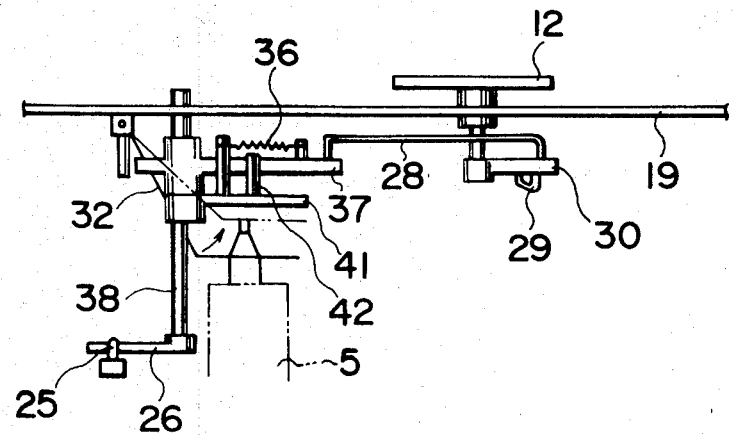

Another method is shown in FIGS. 7a and 7b.

According to the method of FIGS. 7a and 7b, a double lever is provided to connect a rod 28 to the pin 25, and the amount displaced by the presence or absence of cops in the magazine is transmitted to said double lever by means of the feeler 32 provided in the supplying truck, so that when there is a cop in the magazine can, the stopper will not take out the cop container K in spite of the fact that the pin 25 is protruded. That is, the lever 37 to which is connected the rod 28 is located at such a position as to come into contact with a stopper 40 which turns responsive to the movement of the feeler 32 that is rotatably fitted to the supplying truck. The lever 26 and a shaft 38 are fixed, and a lever 41 is secured onto the shaft 38. A spring 36 is hooked between the lever 41 and the lever 37, and the angular position of the lever 37 and the shaft 38 are determined by the stopper 42 provided on the lever 41.

The presence of a cop in a magazine can causes the stopper 40 to come into contact with a lever 39. Therefore, even if the lever 26 is turned by the pin 25, the lever 37 is not turned and the stopper 12 is not opened.

It should be clear that lever 39 is the opposite end of lever 37 and that these levers are mounted for rotation relative to shaft 38.

Figure 8:
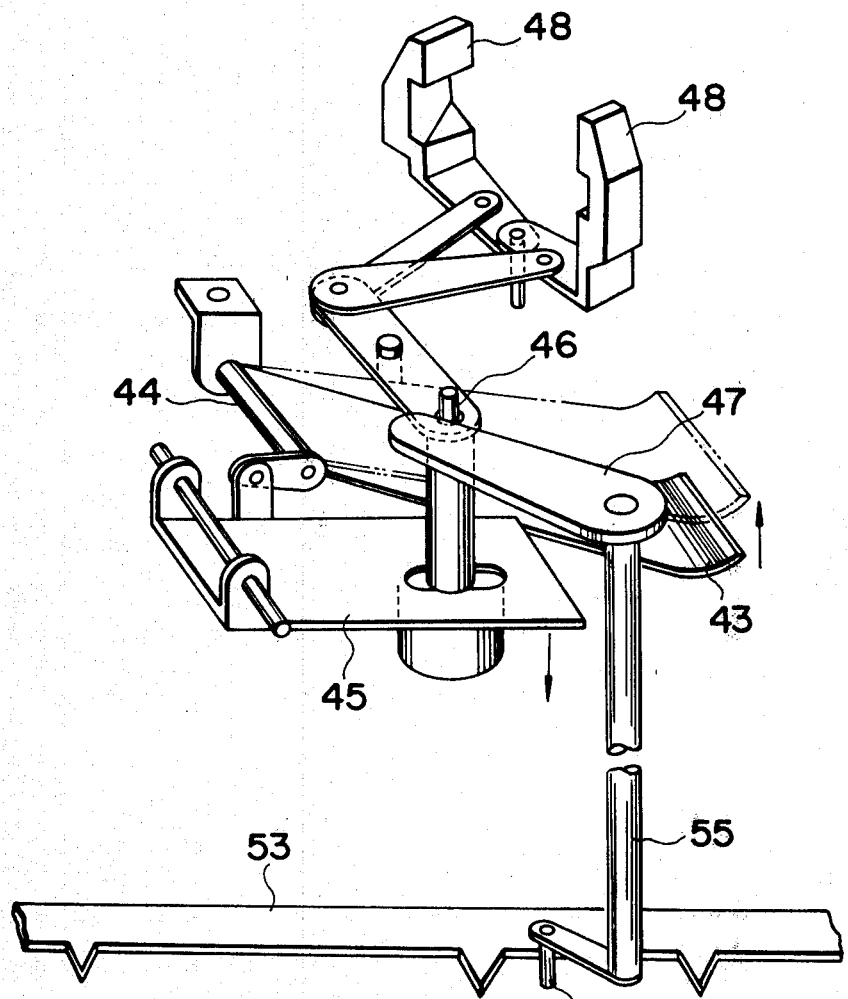
FIG. 8 is a perspective view showing a further embodiment of the take-out device.
Figure 9:
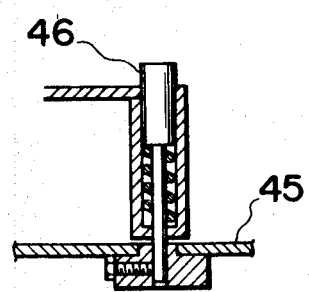
FIG. 9 is a partially sectional view of the device of FIG. 8.
Figure 10:
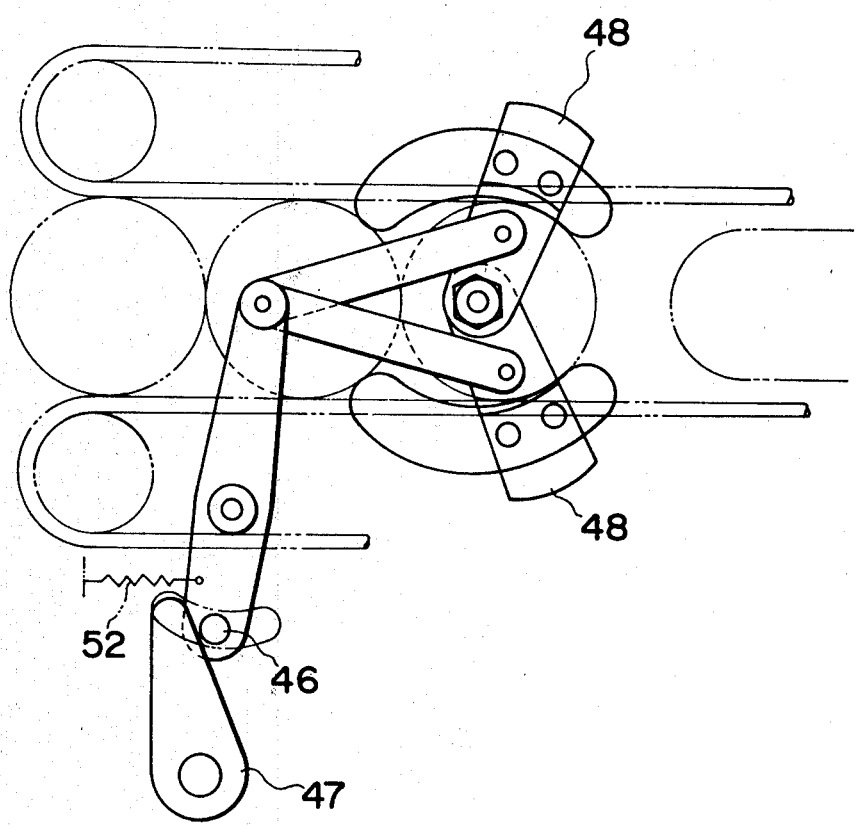
FIG. 10 is a partial plan view of the device of FIG. 8.

FIG. 8 to FIG. 10 show a further embodiment, in which a cam plate 53 is provided along the magazine of the winding unit, a crank pin 54 comes into contact with a projection of the cam plate 53, causing stoppers 48, 48 to actuate by means of a transmission device such as rod 55, lever 47 and pin 46, whereby the cop container is fed being released from holding between the stoppers or the cop is held therebetween. A feeler 43 is further provided to detect the presence or absence of the cop in the magazine. If the cop is present in the magazine, the feeler 43 turns in the direction of arrow A with the shaft 44 as a fulcrum, a plate 45 is pushed down, the pin 46 is lowered beneath the lever 47, so that even if the lever 47 is turned, the stoppers 48, 48 which hold the cop container therebetween are not actuated, and the cop is not supplied. Reference numeral 52 represents a spring.

Referring now to FIG. 2, the supplying truck H receives the cop into the cop container K, by the automatic cop feeding apparatus 4 and moves toward the left in the drawing over the magazine can 5.

Here, with the magazine cans being disposed around the suction nozzle, if there is no cop in the magazine can located at the rear of the suction nozzle when viewed from the running direction of the supplying truck (i.e., on the right side in FIG. 2), the stopper 12 is opened by the engagement of the pin 25 with the lever 26 or by the electrical coupling of the pin and the stopper 12, and the cop container K is take out.

The thus taken-out cop container is caused to travel in the direction (of arrow Y) opposite to the running direction (arrow X) of the supplying truck as shown in FIG. 3, by means of the belts 17 and 18 at a speed substantially equal to that of the supplying truck.

Therefore, the relative speed between the cop container and the magazine can is maintained substantially at zero, while the elongated hole 20 moves. Then the cop is thrown into the magazine can within a period of time determined by the size of the elongated hole.

Therefore, the running speed of the supplying truck can be increased limitlessly though the free falling of the cop from the cop container into the magazine is limited by the time determined when it passes through the elongated hole.

The cop container from which a cop was thrown into a magazine can is moved from the belt 7 to belt 7-1, through up to the belt 7-5, and finally reaches the end of the array of the stored cop containers, and stops. The supplying truck thus reached the driving side 6, immediately returns to the automatic cop feeding apparatus 4 and receives the cops from the automatic cop feeding apparatus.

Figure 3D:
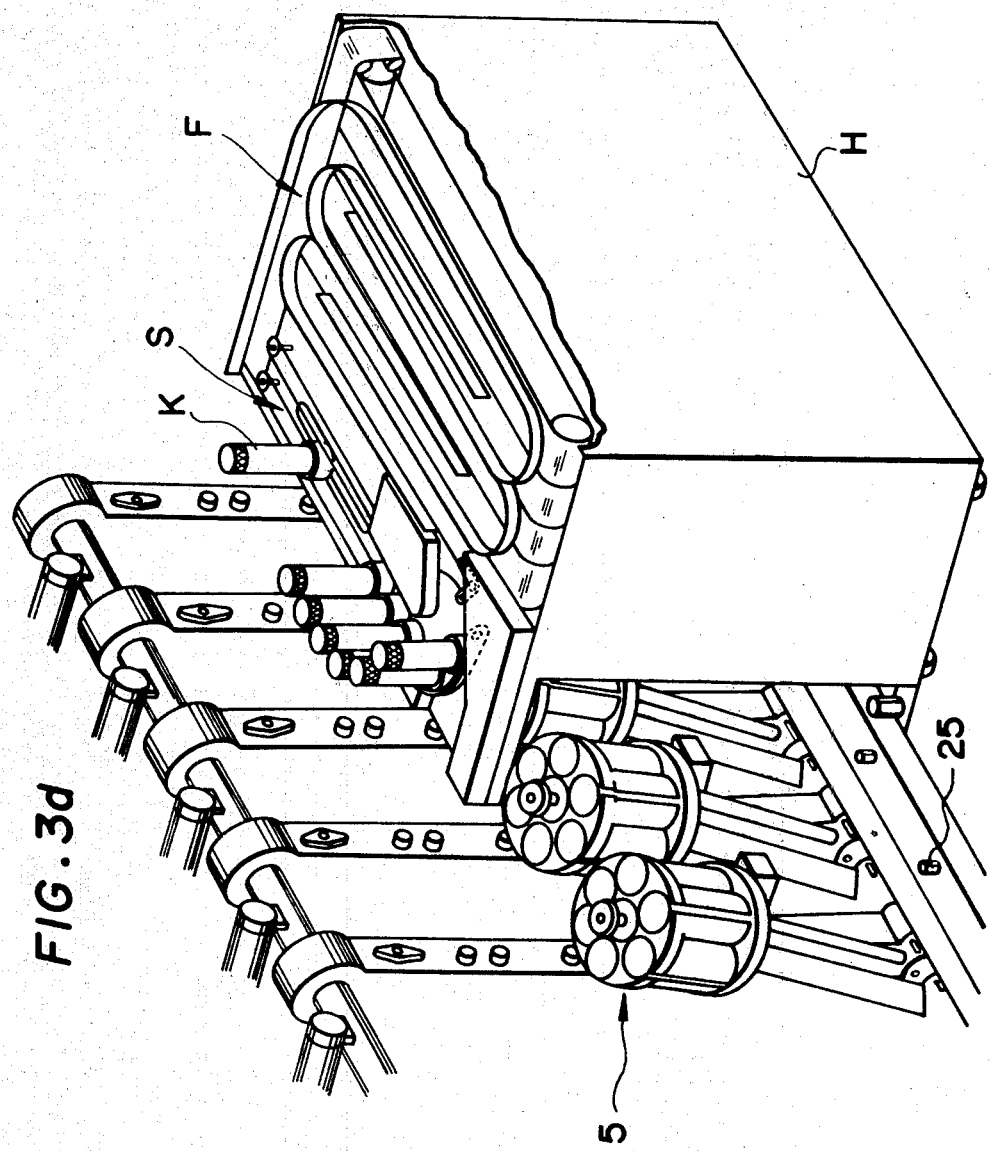
FIG. 3d is a perspective view showing a relation between the supplying truck and the magazine.

In the case of FIGS. 3a and 3b, the cops will be directly introduced into the containers placed on the supplying truck. In the case of FIGS. 3c, 3d and 3e, however, both the empty cop containers from which cops have been thrown and the full cop containers from which cops have not yet been thrown are removed from the supplying truck. Therefore, after the supplying truck has stopped at and come into contact with the automatic cop feeding apparatus, a piece member 56 which can be opened and closed is opened as represented by a dotted line, permitting the cop containers to successively be transferred onto the automatic cop feeding apparatus via a path 50. However, the cop containers containing cops are interrupted along their way by a selecting member 57 which may close the path as represented by a dotted line, and are returned onto the supplying truck via a by-pass 58, a piece member 59, which opens to communicate the path 58 with a pass 51. On the other hand, as an empty cop container without containing a cop reaches the selecting member 57, the selecting member is opened and the cop container travels on the automatic cop feeding apparatus to receive a cop as designated at Q. The cop container is thereafter returned to the supplying truck via the path 51 being interrupted and turned by the closed piece member 59.

What is claimed is:

1. A method for transferring and supplying cops to an automatic winding machine having a plurality of winding units including the step of providing a magazine including magazine cans with each unit, driving a cop supplying truck in front of the winding units and along a train of magazines and feeding cops contained on the cop supplying truck to the magazines one by one, characterized by running the supply truck continuously, positioning on a conveyor device of the supply truck a plurality of cylindrical cop containers without bottom plates which contain a cop errected vertically therein, and feeding the cop in a falling manner from the supplying truck in to a magazine can of a magazine requiring a supply of a new cop.

2. A method for transferring and supplying cops according to claim 1, wherein the method includes the steps of detecting the existence of a cop in the magazine when the supplying truck passes over the magazine, taking one cop container out of the stored cop containers if a cop does not exist in the magazine, and transferring only the cop contained in the one cop container from the supplying truck to the magazine can of the magazine requiring a supply of a new cop.

3. A method for transferring and supplying cops according to claim 1, wherein an elongated hole is formed on the cop supplying truck extending in a direction parallel to the direction in which said truck runs, and further including the step of transferring the cop contained in the cop container without a bottom plate onto the truck having the elongated hole thereon while it is traveling at a speed substantially equal to the running speed of the cop supplying truck and in a direction opposite to the running direction of said cop supplying truck, whereby the cop is allowed to fall through said elongated hole.

* * * * *